(12) United States Patent
Ekmekci et al.

(10) Patent No.: US 12,159,251 B2
(45) Date of Patent: Dec. 3, 2024

(54) SYSTEMS AND METHODS FOR IDENTIFYING AN EVENT IN DATA

(71) Applicant: Thomson Reuters Enterprise Centre GmbH, Zug (CH)

(72) Inventors: Berk Ekmekci, Sterling, VA (US); Eleanor Hagerman, Annandale, VA (US); Blake Stephen Howald, Northfield, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 17/903,123

(22) Filed: Sep. 6, 2022

(65) Prior Publication Data
US 2023/0004723 A1     Jan. 5, 2023

Related U.S. Application Data

(63) Continuation of application No. 16/700,746, filed on Dec. 2, 2019, now Pat. No. 11,461,555.
(Continued)

(51) Int. Cl.
*G06F 40/30*     (2020.01)
*G06F 9/54*      (2006.01)
(Continued)

(52) U.S. Cl.
CPC ......... *G06Q 10/0635* (2013.01); *G06F 9/542* (2013.01); *G06F 18/22* (2023.01);
(Continued)

(58) Field of Classification Search
CPC ..... G06Q 10/0635; G06F 9/542; G06F 18/22; G06F 16/3344; G06V 10/443
See application file for complete search history.

(56) References Cited

U.S. PATENT DOCUMENTS 9,081,814 B1 * 7/2015 Carroll .................. G06F 16/245
9,336,192 B1   5/2016 Barba et al.
(Continued)

FOREIGN PATENT DOCUMENTS

JP     H07192011 A     7/1995

OTHER PUBLICATIONS

International Search Report and Written Opinion issued for PCT Application No. PCT/US2019/064036, dated Mar. 2, 2020, 12 pages.
(Continued)

*Primary Examiner* — Jesse S Pullias
(74) *Attorney, Agent, or Firm* — Norton Rose Fulbright US LLP

(57) ABSTRACT

The present disclosure includes systems, apparatuses, and methods for event identification. In some aspects, a method includes receiving data including text and performing natural language processing on the received data to generate processed data that indicates one or more sentences. The method also includes generating, based on a first keyword set, a second keyword set having more keywords than the first keyword set. The method further includes, for each of the first and second keyword sets: detecting one or more keywords and one or more entities included in the processed data, determining one or more matched pairs based on the detected keywords and entities, and extracting a sentence, such as a single sentence or multiple sentences, from a document based on the one or more sentences indicated by the processed data. The method may also include outputting at least one extracted sentence.

36 Claims, 5 Drawing Sheets

Related U.S. Application Data

(60) Provisional application No. 62/773,502, filed on Nov. 30, 2018.

(51) Int. Cl.
| | |
|---|---|
| *G06F 18/22* | (2023.01) |
| *G06F 40/151* | (2020.01) |
| *G06F 40/284* | (2020.01) |
| *G06F 40/289* | (2020.01) |
| *G06Q 10/0635* | (2023.01) |
| *G06V 10/44* | (2022.01) |

(52) U.S. Cl.
CPC .......... *G06F 40/151* (2020.01); *G06F 40/284* (2020.01); *G06F 40/289* (2020.01); *G06F 40/30* (2020.01); *G06V 10/443* (2022.01)

(56) References Cited

U.S. PATENT DOCUMENTS

| | | | |
|---|---|---|---|
| 11,023,554 B1 | 6/2021 | Miller et al. | |
| 11,461,555 B2* | 10/2022 | Ekmekci | G06F 18/22 |
| 2004/0221235 A1 | 11/2004 | Marchisio et al. | |
| 2005/0222981 A1 | 10/2005 | Lawrence et al. | |
| 2008/0077585 A1* | 3/2008 | Li | G06Q 40/04 |
| 2009/0299998 A1 | 12/2009 | Kim | |
| 2010/0064001 A1 | 3/2010 | Daily | |
| 2010/0082331 A1 | 4/2010 | Brun et al. | |
| 2011/0282856 A1* | 11/2011 | Ganti | G06F 40/247 |
| | | | 707/706 |
| 2011/0307435 A1 | 12/2011 | Overell et al. | |
| 2011/0307460 A1* | 12/2011 | Vadlamani | G06F 16/951 |
| | | | 707/706 |
| 2013/0129307 A1* | 5/2013 | Choe | G06F 16/738 |
| | | | 386/227 |
| 2013/0246046 A1 | 9/2013 | Fan et al. | |
| 2014/0258001 A1 | 9/2014 | Ramaksrihnan et al. | |
| 2014/0372102 A1 | 12/2014 | Hagege et al. | |
| 2015/0120738 A1 | 4/2015 | Srinivasan | |
| 2016/0132572 A1 | 5/2016 | Chang et al. | |
| 2017/0277996 A1 | 9/2017 | Vogel et al. | |
| 2018/0060340 A1 | 3/2018 | Hazra et al. | |
| 2018/0143975 A1 | 5/2018 | Casal et al. | |
| 2018/0197128 A1 | 7/2018 | Carstens et al. | |
| 2018/0203921 A1 | 7/2018 | Privault et al. | |
| 2018/0365230 A1 | 12/2018 | Jang | |
| 2018/0365326 A1 | 12/2018 | Jiang et al. | |
| 2019/0318364 A1 | 10/2019 | Marascu et al. | |
| 2020/0110801 A1 | 4/2020 | Zheng et al. | |

OTHER PUBLICATIONS

International Search Report and Written Opinion issued for PCT Application No. PCT/IB2020/054007, dated Jul. 24, 2020, 9 pages.

Wichmann et al., "Towards automatically generating supply chain maps from natural language text," Article in IFAC—PapersOnLine, Jan. 2018.

Ekmekci, B. et al. "A Consolidated System for Robust Multi-Document Entity Risk Extraction and Taxonomy Augmentation," Retrieved from the Internet: https://arxiv.org/pdf/1909.10368v1.pdf, [Retrieved on Apr. 24, 2023], Sep. 23, 2019, 7 pages.

McKeown, K. R. et al. "Columbia Multi-Document Summarization: Approach and Evaluation," Retrieved from the Internet: https://www-nlpir.nist.gov/projects/duc/pubs/2001papers/columbia_redo.pdf>, Jan. 1, 2001, 21 pages.

Okazaki, N. et al. "TISS: An Integrated Summarization System for TSC-3," Retrieved from the Internet: https://research.nii.ac.jp/ntcir/workshop/OnlineProceedings4/TSC/NTCIR4-TSC-OkazakiN.pdf, [Retrieved on Apr. 24, 2023], Jun. 1, 2004, 8 pages.

European Patent Office, Communication, Extended European Search Report issued for European Patent Application No. 20809703.0, dated May 8, 2023, 9 pages.

* cited by examiner

SYSTEMS AND METHODS FOR IDENTIFYING AN EVENT IN DATA

CROSS-REFERENCE TO RELATED APPLICATIONS

The present application is a continuation of U.S. patent application Ser. No. 16/700,746 filed Dec. 2, 2019 and entitled "SYSTEMS AND METHODS FOR IDENTIFYING AN EVENT IN DATA," which claims priority to U.S. Provisional Application No. 62/773,502 filed Nov. 30, 2018, and entitled, "CEREAL: A Consolidated System for Robust Multi-Document Entity Risk Extraction and Taxonomy Augmentation," the disclosures of which are incorporated by reference herein in their entirety.

TECHNICAL FIELD

The present subject matter is directed generally to event identification, and more particularly but without limitation, to identifying or predicting a risk event in textual data.

BACKGROUND

Identifying or predicting risk events in textual data associated with individuals, companies, and other entities is a common natural language processing (NLP) task known as risk mining. Monitoring systems rely on risk mining to describe risk events that are passed on to an expert for analysis.

Risk mining research is often focused on classification of risk from non-risk and the features that contribute to the distinction. For example, prior risk mining research has considered features such as textual association with stock price movement and financial documents, sentiment features in identifying banking risks, and textual features for risk in news. Additionally, heuristic classifications have been used in which seed patterns that describe risk relationships are used to augment a risk taxonomy used in an alert monitoring system for earnings reports. The risk taxonomy can be a source of information in risk mining whether the result of manual definition, machine learning classification, or both, crowdsourcing, and/or paraphrase detection. Although risk mining research has been explored, the quality of risk mining results are often less than acceptable and/or require manual review of the risk mining results to obtain filtered results. Additionally, large quantities of results can make the manual review process time consuming and delay or prolong timely review of the risk mining results.

SUMMARY

The present application relates to systems and methods for event identification and/or prediction of events, such as risk event identification and/or prediction in textual data. To illustrate, the systems and methods may use a predefined keyword taxonomy, entities and data sources to generate and return text extractions based on bidirectional distances (e.g., token distances) between entities and keywords. For example, data including text from a data source, such as a streaming data source, news data, a database, or a combination thereof, may be received and natural language processing (NLP) is performed on the data. In some implementations, the NLP may generate processed data that indicates one or more sentences. Additionally, or alternatively, the NLP may include tokenization, lemmatization, and/or sentencization on the data. In a particular implementation, the NPL includes a natural language processing pipeline including (in sequence) a tokenizer, a part-of-speech tagger, a dependency parser, and a named entity recognizer. It is noted that a dependency-based sentencizer may be used as compared to a simpler stop-character based approach due to the unpredictable formatting of certain domains of text—e.g. web-mined news and regulatory filings. After the NLP, a set of keywords are compared to the processed data to detect keywords included in the processed data. For each detected keyword, a corresponding entity is identified that is positioned closest to the corresponding keyword to determine a matched pair for the keyword. In some implementations, a distance between the keyword and the entity of the matched pair is compared to a threshold distance for purposes of discarding matched pairs. Based on a particular matched pair, the systems and methods may extract a sentence, such as a single sentence or multiple sentences, from a document based that includes the matched pair (e.g., the entity and the keyword). The systems and methods may also output at least one extracted sentence. The extracted sentence may be stored or provided to an electronic device for review and/or analysis.

In some implementations, the systems and methods may also expand an initial seed taxonomy, such as a keyword set, using word vector encodings. For example, for at least one document of one or more documents corresponding to the data, a corresponding semantic vector may be generated— e.g., based on a skipgram model that utilizes words and subwords from the document. For at least one keyword, the at least one keyword is compared to each of one or more semantic vectors to determine a corresponding similarity score. A semantic vector having a highest similarity score to the keyword is identified to determine a term of the identified semantic vector as a candidate term. In some implementations, the similarity score of the determined semantic vector having a highest similarity score is compared to a threshold to determine whether or not to discard the candidate term—e.g., the term is discarded if the score is less than or equal to the threshold. The candidate term may be added to the keyword set to generate the expanded keyword set. The initial keyword set and/or the expanded keyword may be applied to the processed data to identify matched pairs and to extract one or more sentences as described above.

Thus, the present disclosure provides the ability to extract events (e.g., risks) at scale, improve the quality of the extractions over time, grow the keyword taxonomy to increase coverage, and do so with minimum manual effort. The systems and methods described herein also include a scalable system for finding entity-event pairings which, as compared to other systems, better incorporate human insights in the initial system configuration to obviate the need for a risk classification engine. For example, the systems and methods described herein provide a hybrid human-automated system that provides scalable event-monitoring capabilities. Further, without relying on multiple complex NLP sub-systems to make connections between entities and event keywords, the system may derive maximum benefit from surface information. Because of the specificity of the initial taxonomy, extracts are assumed to express some degree of entity-risk relationships and are based on "shallow" surface parsing rather than deeper morpho-syntactic parsing. Additionally, the degree to which these two deviations hold is the subject of the evaluation— e.g., comparing to a distance threshold between keyword and entity. To illustrate, the systems and methods described herein may utilize techniques, such as filtering and/or thresholding, to address high recall associated with the predefinition of the seed taxonomy. Additionally, or alternatively, the systems and methods described herein may address high system recall relative to maintaining flexibility for analyst users and dynamic definition of the risk problem space—this may include summarization of results for better presentation, alternative source data at the direction of the analyst for given risk categories, and token distance thresholding.

It is noted that while applied here to the risk mining space, in other implementations, the system could be used for any data, entities and taxonomies to support generalized event monitoring. To illustrate, the systems and methods may be equally applicable to other areas of identification and/or predication, such as document review, auditing, and the like, as illustrative, non-limiting examples.

In one particular aspect, a method for identifying an event in data includes receiving data at a receiver from a data source, the data including one or more documents each including text. The method includes performing natural language processing on the received data to generate processed data. The processed data indicates one or more sentences. The method includes generating, based on the data and a first keyword set, a second keyword set having a greater number of keywords than the first keyword set. The method also includes, for each keyword set of the first keyword set and each keyword in the second keyword set: detecting one or more keywords and one or more entities included in the processed data based on the keyword set and an entity set, determining one or more matched pairs based on the detected one or more keywords and the detected one or more entities, extracting a sentence from a document based on the one or more sentences indicated by the processed data, and outputting the extracted sentence. The sentence corresponds to at least one matched pair of the one or more matched pairs and includes a single sentence or multiple sentences.

In another aspect, a system may be provided. The system includes a data ingestor configured to receive data at a receiver from a data source and to perform natural language processing on the received data to generate processed data. The data includes one or more documents each including text, and the processed data indicates one or more sentences. The system includes a taxonomy expander configured to generate, based on the data and a first keyword set, a second keyword set having a greater number of keywords than the first keyword set. The system also includes a term detector configured to detect, for each keyword set of the first keyword set and each keyword in the second keyword set, one or more keywords and one or more entities included in the processed data based on the keyword set and an entity set. The system further includes an output generator configured to, for each keyword set of the first keyword set and the second keyword set: determine one or more matched pairs based on the detected one or more keywords and the detected one or more entities, extract a sentence from a document based on the one or more sentences indicated by the processed data, and output the extracted sentence. The sentence corresponds to at least one matched pair of the one or more matched pairs and includes a single sentence or multiple sentences.

In yet another aspect, a computer-based tool may be provided. The computer-based tool may include non-transitory computer readable media having stored thereon computer code which, when executed by a processor, causes a computing device to perform operations that include receiving data at a receiver from a data source. The data includes one or more documents each including text. The operations include performing natural language processing on the received data to generate processed data. The processed data indicates one or more sentences. The operations also include generating, based on the data and a first keyword set, a second keyword set having a greater number of keywords than the first keyword set. The operations further include, for each keyword set of the first keyword set and each keyword in the second keyword set: detecting one or more keywords and one or more entities included in the processed data based on the keyword set and an entity set, determining one or more matched pairs based on the detected one or more keywords and the detected one or more entities, extracting a sentence from a document based on the one or more sentences indicated by the processed data, and outputting the extracted sentence. The sentence corresponds to at least one matched pair of the one or more matched pairs and includes a single sentence or multiple sentences.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
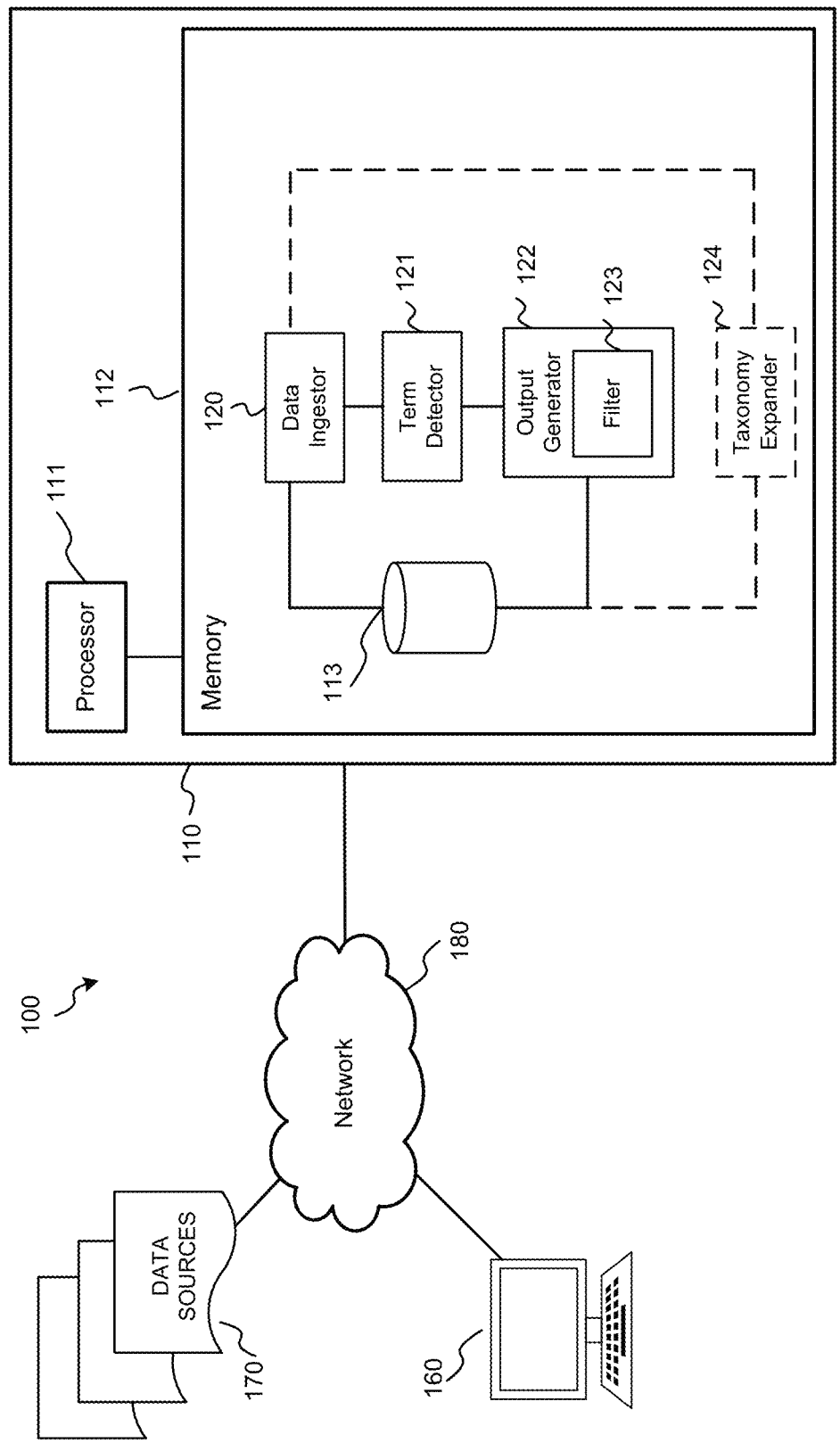
FIG. 1 shows a system configured to perform operations in accordance with aspects of the present disclosure.

FIG. 1 is a block diagram of an exemplary system 100 configured with capabilities and functionality for event identification. As shown in FIG. 1, system 100 includes server 110, at least one user terminal 160, at least one data source 170, and network 180. These components, and their individual components, may cooperatively operate to provide functionality in accordance with the discussion herein. For example, in operation according to one or more implementations, data (e.g., textual data or documents) may be obtained from data sources 170 and may be provided as input to server 110. The various components of server 110 may cooperatively operate to perform event identification and/or prediction. For example, the various components of server 110 may cooperative operate to perform natural language processing (NLP) is performed on the data In some implementations, the NLP may generate processed data that indicates one or more sentences. After the NLP, the various components of server 110 may compare a set of keywords to the processed data to detect keywords included in the processed data. For each detected keyword, a corresponding entity is identified that is positioned closest to the corresponding keyword to determine a matched pair for the keyword. In some implementations, a distance between the keyword and the entity of the matched pair is compared to a threshold distance for purposes of discarding matched pairs. Based on a particular matched pair, the various components of server 100 may extract a sentence, such as a single sentence or multiple sentences, from a document based that includes the matched pair (e.g., the entity and the keyword). The sentence may be stored provided to an electronic device for review and/or analysis. As such, various aspects of the present disclosure allow event identification (and generation of a text extraction) based on use of a predefined keyword taxonomy, entities and data sources and based on bidirectional distances (e.g., token distances) between entities and keywords detected within the data.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may be provided with information related to data and information received from server 100. For example, User terminal 160 may receive results of event identification and/or prediction from server 100. The results may include a match pair including a keyword, an entity, or both, one or more extracted sentences, a document identifier, or a combination thereof, as illustrative, non-limiting examples. A user may review the results and provide an analysis or feedback regarding the results. The analysis or feedback may be provided to server 100 from user terminal 160 as an input.

Data sources 170 may comprise at least one source of textual data. For example, the data source(s) may include a streaming data source, news data, a database, a social media feed, a data room, another data source, the like, or a combination thereof. In a particular implementation, the data from data source 170 may include or correspond to one or more entities. The one or more entities may include an individual, a company, a government, an agency, an organization, the like, or a combination thereof, as illustrative, non-limiting examples.

Server 110 may be configured to receive data from data source(s) 170, to apply customized natural language processing algorithms and/or other processing to identify one or more events based on the received data. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system.

As shown in FIG. 1, server 110 includes processor 111, memory 112, database 113, data ingestor 120, output generator 122, and, optionally, taxonomy expander 124. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing one or more keywords (e.g., one or more keyword sets), one or more entities (e.g., an entity set), one or more thresholds, one or more matched pairs, one or more semantic vectors, one or more candidate terms, one or more similarity scores, one or more extracted sentence, input (e.g., from user terminal 160), other information, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include an interface configured to enable communication with data source 170, user terminal 160 (e.g., an electronic device), or a combination thereof Data ingestor 120 may be configured to receive data at a receiver from a data source, the data comprising one or more documents each comprising text, and to perform natural language processing on the received data to generate processed data, the processed data indicating one or more sentences.

Term detector 121 may be configured to detect, for each keyword set of the first keyword set and each keyword in the second keyword set, one or more keywords and one or more entities included in the processed data based on the keyword set and an entity set.

Output generator 122 may be configured to, for each keyword set of the first keyword set and the second keyword set, determine one or more matched pairs based on the detected one or more keywords and the detected one or more entities, and extract a sentence from a document based on the one or more sentences indicated by the processed data, where the sentence corresponds to at least one matched pair of the one or more matched pairs and comprises a single sentence or multiple sentences. To determine the one or more matched pairs, output generator 122 is further configured to for each keyword of the detected one or more keywords, identify a corresponding entity of the detected one or more entities that is positioned closest to the corresponding keyword to determine a matched pair for the keyword, Additionally, output generator 122 may be further configured to store and/or output the extracted sentence.

In some implementations, output generator 122 includes a filter 123. Filter 123 is configured to for each of the one or more matched pairs based on the first keyword set and each of the one or more matched pairs based on the second keyword set, determine a distance between the keyword and the entity of the matched pair, perform a comparison between the determined distance and a threshold, and determine to retain the matched pair or discard the matched pair based on whether or not the comparison indicate the determined distance is greater than or equal to the threshold. For example, filter 123 may discard the matched pair based on the determined distance being greater than or equal to the threshold. Alternatively, filter may retain the matched pair for further processing and/or consideration based on the distance being less than the threshold.

Taxonomy expander 124 may be configured to generate, based on the data and a first keyword set, a second keyword set having a greater number of keywords than the first keyword set. Additional functionality of taxonomy expander 124 is described further herein at least with reference to blocks 240-248 of FIG. 2. It is noted that the functionality of taxonomy expander 124 to expand a keyword set to generate an expanded keyword set may be used prior to, during, or after event identification or prediction.

The database 113 may be coupled to data ingestor 120, term detector 121, output generator 122, taxonomy expander 124, or a combination thereof. In some implementations, database 113 is configured to store the first keyword set, the second keyword set, the entity set, the processed data, one or more thresholds, one or more extracted sentences, a plurality of matched pairs, or a combination thereof.

Figure 2:
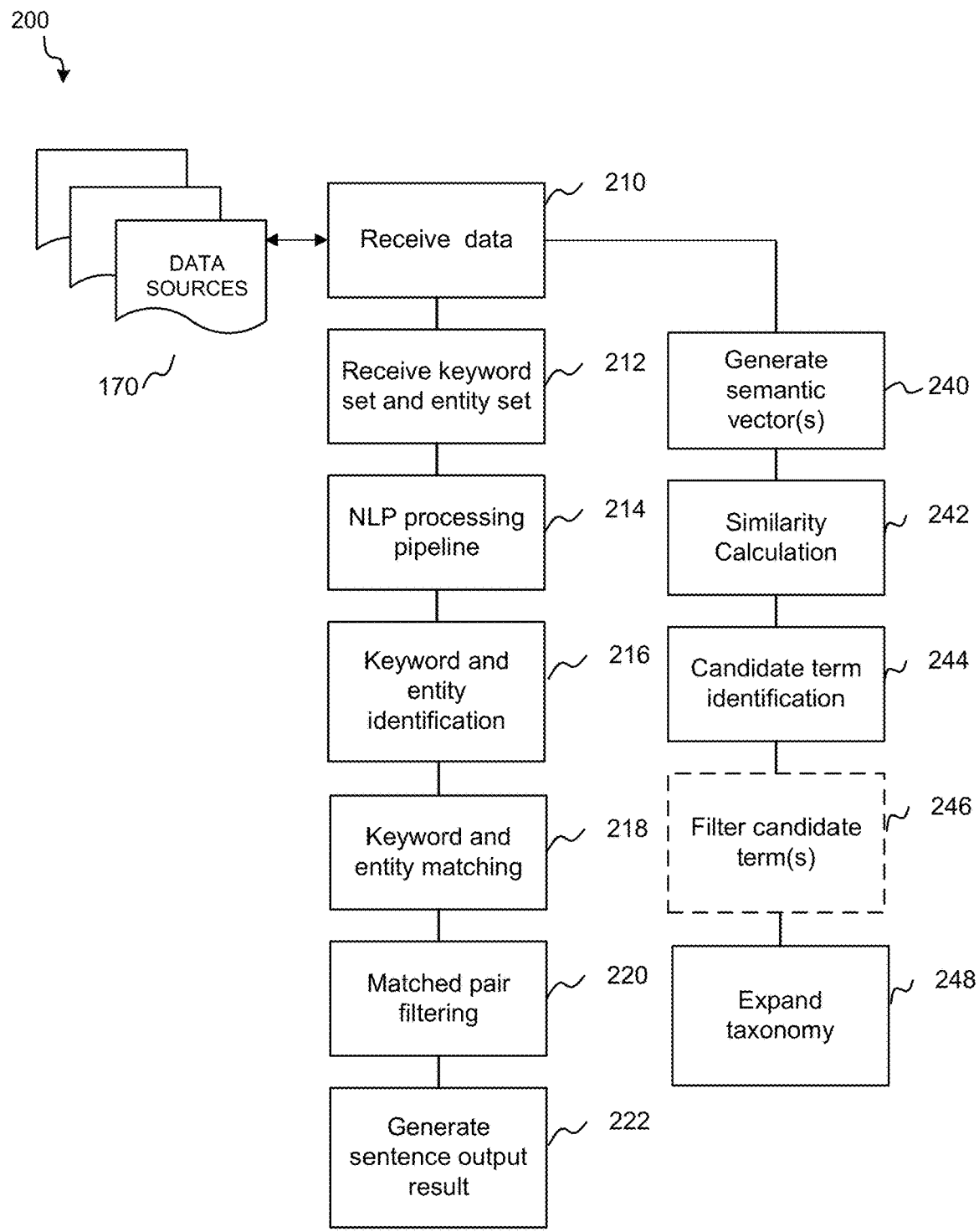
FIG. 2 shows a flow diagram illustrating functionality of the system of FIG. 1 implemented in accordance with aspects of the present disclosure

The functionality of server 110 will now be discussed with respect to the block flow diagram illustrated in FIG. 2. FIG. 2 shows a flow diagram illustrating functionality of system 100 for detecting an event in data. Blocks of method 200 illustrated in FIG. 2 may be performed by one or more components of system 100 of FIG. 1. For example, blocks 210, 212, and 214 may be performed by data ingestor 120, block 216 may be performed by term detector 121, blocks 218-222 may be performed by output generator 122, and blocks 240-248 may be performed by taxonomy expander 124.

At block 210, data is received (e.g., at a receiver). For example, the data may include one or more documents and may be received from data sources 170. In some implementations, data sources 170 may include a streaming data source, news data, a database, or a combination thereof. At block 212, a keyword set and an entity set are received. In some implementations, the keyword set (e.g., seed values) and the entity set may be received based on user input or retrieved from a memory. At block 214, the data is provided to a NLP pipeline to generate processed data that indicates one or more sentences. In some implementations, the NLP pipeline includes (in sequence) a tokenizer, a part-of-speech tagger, a dependency parser, and a named entity recognizer. The dependency parser may be preferable to other types of sentence detectors, such as a stop-character parser, due to the unpredictable formatting of certain domains of text, such as web-mined news and/or regulatory filings.

At block 216, keyword and entity identification is performed. For example, based on a taxonomy, keywords (from the keyword set) may be identified in a list of tokens. To illustrate, the set of keywords are compared to the processed data to detect keywords in the processed data. Similarly, entities (from the entity set) may be identified in a list of tokens. At block 218, keyword and entity matching is performed. For example, for each detected keyword, a corresponding entity is identified that is positioned closest to the corresponding keyword to determine a matched pair for the keyword. The closest entity may be before or after the keyword, and may be in the same sentence or a different sentence.

At block 220, matched pair filtering is performed. For example, a distance (in tokens) between the keyword and the entity of a matched pair is determined, and if the distance is greater than or equal to a threshold, the matched pair is discarded (e.g., filtered out). At block 222, a sentence output result is generated. For example, a sentence that contains a matched pair may be extracted and output. The sentence may be a single sentence (if the keyword and the entity are in the same sentence) or multiple sentences (if the keyword and the entity are in different sentences). The extracted sentence may be output to an electronic device for display to a user for review and/or analysis or the extracted sentence may be stored in a memory for later processing.

Method 200 also enables expansion of an initial seed taxonomy. To illustrate, at block 240, semantic vectors are generated. For example, for at least one document of the received data, a corresponding semantic vector may be generated. In some implementations, the semantic vector may be generated based on a skipgram model that utilizes words and subwords from the document. At block 242, a similarity calculation is performed. For example, at least one keyword is compared to each of the generated semantic vectors to determine corresponding similarity scores.

At block 244, candidate term identification is performed. For example, a semantic vector having a highest similarity score to the keyword is identified to identify a term of the semantic vector as a candidate term. Optionally, at block 246, candidate terms are filtered. For example, the similarity score of the candidate term is compared to a threshold to determine whether or not to discard the candidate term (e.g., the candidate term is discarded if the score is less than or equal to the threshold). At block 248, the taxonomy is expanded. For example, one or more candidate terms are added to the taxonomy to generate the expanded taxonomy (e.g., an expanded keyword set). The expanded taxonomy may be used in performing keyword-entity matching, as described with reference to the operations of blocks 212-222.

In some implementations of FIG. 1, system 100 provides a hybrid-automated system that leverages human insight at the outset with expert (a) defined entities; (b) defined data sources; and (c) defined keyword taxonomy. For example, by leveraging (a-c), system 100 (e.g., server 110) may return extractions based on bidirectional entity keyword surface distances for expert evaluation. For example in example sentences (1) below, the risk term "pipe bomb" is a risk associated with the entity Time Warner.

(1)(a) Later Wednesday, CNN received a pipe bomb at its Time Warner Center headquarters at Manhattan sent to ex-CIA director John Brennan and a suspicious package sent to Rep. Maxine Waters . . . .

(1)(b) On Monday, a pipe bomb was found in a mailbox at the Katonah home of billionaire business magnet and political activist George Soros.

Referring to sentences (1)(a) and (1)(b), system 100 may return both the single sentence (1)(a) and multi-sentences (1)(a-b) without the need for a separate risk classification engine or more complex NLP. System 100 may also increase taxonomy coverage by encoding word vectors trained on the same sources of data (suspicious package in (1)(a)). Accordingly, server 110 may return high value information to analysts collaborating with server 100 It is noted that the operations and functionality provided by server 110 combines the efficiencies that tuned Machine Learning (ML) systems can offer with the rich depth of experience and insight that analysts bring to the process.

Thus, system 100 (e.g., server 110) and its corresponding operations and functions, provides the ability to extract events (e.g., risks) at scale, improve the quality of the extractions over time, grow the keyword taxonomy to increase coverage, and do so with minimum manual effort. System 100 also includes a scalable system for finding entity-event pairings which, as compared to other systems, better incorporate human insights in the initial system configuration to obviate the need for a risk classification engine. For example, system 100 provides a hybrid human-automated system that provides scalable event-monitoring capabilities. Further, without relying on multiple complex NLP sub-systems to make connections between entities and event keywords, system 100 (e.g., server 110) may derive maximum benefit from surface information. Because of the specificity of the initial taxonomy, extracts are assumed to express some degree of entity-risk relationships and are based on "shallow" surface parsing rather than deeper morpho-syntactic parsing. Additionally, the degree to which these two deviations hold is the subject of the evaluation—e.g., comparing to a distance threshold between keyword and entity. To illustrate, system 100 may utilize the techniques described herein, such as filtering and/or thresholding, to address high recall associated with the predefinition of the seed taxonomy. Additionally, or alternatively, system 100 may address high system recall relative to maintaining flexibility for analyst users and dynamic definition of the risk problem space—this may include summarization of results for better presentation, alternative source data at the direction of the analyst for given risk categories, and token distance thresholding.

A system of the present disclosure is a custom NLP processing pipeline capable of the ingesting and analyzing hundreds of thousands of text documents. The system includes at least four components:

1. Document Ingest and Processing: Raw text documents are read and tokenization, lemmatization, and sentencization are performed.
2. Keyword/Entity Detection: Instances of both keywords and entities are identified in the processed text, and each risk keyword occurrence is matched to the nearest entity token.
3. Match Filtering and Sentence Retrieval: Matches within the documents are filtered and categorized by pair distance and/or sentence co-occurrence, and the filtered sentences are retrieved for context.
4. Semantic Encoding and Taxonomy Expansion: A semantic vectorization algorithm is trained on domain-specific text and used to perform automated expansion of the keyword taxonomy.

This design architecture allows for significant customization, high throughput, and modularity for uses in experimental evaluation and deployment in production use-cases. The system may support decentralized or streaming architectures, with each document being processed independently and learning systems (specifically at the semantic encoding/expansion steps) configured for continuous learning or batch model training.

One or more known systems can be used for document ingest and low level NLP, such as spaCy, as a non-limiting example. For example, a default NLP pipeline may run tokenizer→part-of-speech tagger→dependency parser-→named entity recognizer.

Sentence breaks found by the dependency parser may be used to annotate each of the found keyword-entity pairs as being either in the same or different sentences. A dependency-based sentencizer is preferred to a simpler stop-character based approach due to the unpredictable formatting of certain domains of text, e.g., web-mined news and regulatory filings.

The system may allow for a text generator object to be provided, and may take advantage of multi-core processing to parallelize batching. In such an implementation, each processed document piped in by the system is converted to its lemmatized form with sentence breaks noted so that sentence and multi-sentence identification of keyword/entity distances can be captured.

In the absence of intervening information or a more sophisticated approach to parsing, the mention of an entity and risk keyword in a phrase or sentence is the most coherent semantically and pragmatically (as well as morpho-syntactically). For example, example sentence (2) below describes the entity Verizon and its litigation risk associated with lawsuit settlement (keywords being settle and lawsuit).

(2) In 2011, Verizon agreed to pay $20 million to settle a class-action lawsuit by the federal Equal Employment Opportunity Commission alleging that the company violated the Americans with Disabilities Act by denying reasonable accommodations for hundreds of employees with disabilities.

Returning the entire sentence yields additional information—the lawsuit is class-action and the allegation in the complaint is that Verizon "denied reasonable accommodations for hundreds of employees with disabilities." The detection process performed by the system begins by testing for matches of each keyword with each entity, for every possible keyword-entity pairing in the document. Algorithm 1 provides the simplified pseudocode for this process.

---

Algorithm 1 Entity-Keyword Pairing

---

Require: taxonomy and entities lists
  for keyword in taxonomy do
    for entity in entities do
      keywordLocs =-findLocs(keyword)
      entityLocs = findLocs(entity)
      for kLoc in keywordLocs do
        bestHit = findClosestPair(kLoc, entityLocs)
        results.append((key word, entity, bestHit))
      end for
    end for
  end for
return findClosestPair is two token indicies

---

In some implementations, for every instance of every keyword, the nearest instance of every available entity is paired—regardless of whether it precedes or proceeds the keyword. Furthermore, an entity may be found to have multiple risk terms associated with it, but each instance of a risk term will only apply itself to the closest entity. This helps prevent overreaching conclusions of risk while allowing the system to remain flexible. For example, example sentence (3) extends the extract of example sentence (2) to the prior contiguous sentence which contains settlement. This extension provides greater context for Verizon's lawsuit. Example sentence (3) is actually background for a larger proposition being made in the document that Verizon is in violation of settlement terms from a previous lawsuit.

(3) McDonald says this treatment violated the terms of a settlement the company reached a few years earlier regarding its treatment of employees with disabilities. In 2011, Verizon agreed to pay $20 million to settle a class-action lawsuit by the federal Equal Employment Opportunity Commission . . . .

The "shallow" parsing approach of the system promotes efficiency and is preferable to more complex NLP, e.g., chunking or co-reference resolution. Nonetheless, this flexibility comes at a computational cost: a total of (m·a)×(n·b) comparisons must be made for each document, where m is the number of keyword terms across all taxonomic categories, a the average number of instances of each keyword per document, n the number of entities provided, and b the average number of entity instances per document. Changing any single one of these variables will result in computational load changing with O(n) complexity, but their cumulative effects can quickly add up. For parallelization purposes, each keyword is independent of each other keyword and each entity is independent of each other entity. This means that in an infinitely parallel (theoretical) computational scheme, the system runs on O(a×b), which will vary as a function of the risk and text domains.

After keyword-entity pairing, the system has completed a substantial part of document processing and risk identification. The next component seeks to (a) filter away results unlikely to hold analytic value; and (b) identify the hits as being either single sentence or multi-sentence using the sentence information. The first of these goals may be achieved with a simple hit distance cutoff where any keyword-entity pair with more than a particular count of intervening tokens is discarded. A particular setting of a hard cutoff (e.g., a particular amount) improves keyword-entity spans by not including cross-document matches for large documents. Once filtering is complete, the system uses document sentence breaks to determine the membership of each keyword and entity for each pairing and, ultimately, whether they belong to the same sentence.

The system may automate term expansion by using similarity calculations of semantic vectors. These vectors are generated by training a skipgram model, which relies on words and subwords from the same data source as the initial extractions. This ensures that domain usage of language is well-represented, and any rich domain-specific text may be used to train semantic vectors.

For each taxonomic risk term encountered, the model vocabulary for the minimized normalized dot product $r \cdot w/\|r\|\|w\|$ (e.g., a basic similarity score) is searched, and the system returns the top-scoring vocabulary terms as candidates for taxonomic expansion.

EXAMPLE

Figure 3:
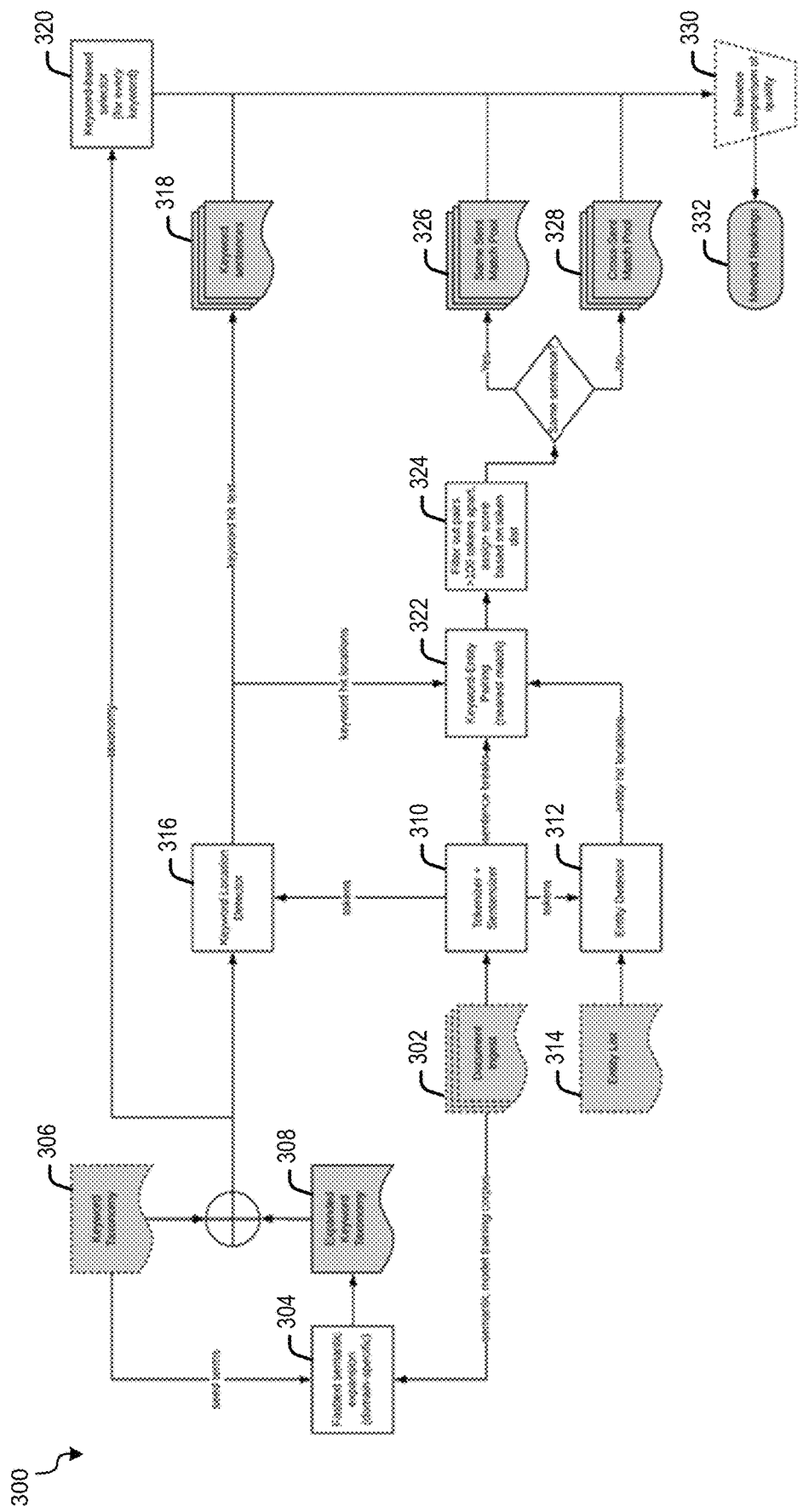
FIG. 3 is a block diagram of a system for identifying an event in data in accordance with the present disclosure.

FIG. 3 shows an example system 300 in accordance with the present disclosure. The system 300 includes a document ingest 302, a semantic expansion 304, a keyword taxonomy 306, an expanded keyword taxonomy 308, a tokenizer and sentencizer 310, an entity detector 312, an entity list 314, a keyword location detector 316, keyword sentences 318, a keyword-based selector 320, a keyword entity pairing 322, a filter 324, a same sentence match pool 326, a cross-sentence match pool 328, a comparator 330, and method rankings 332.

Document ingest 302 includes a corpus of documents (e.g., one or more documents) that are ingested into system 300 (e.g., via a document ingestor). The document corpus is provided as a semantic model training corpus to semantic expansion 304. Semantic expansion 304 is a domain-specific semantic expander configured to expand a taxonomy based on the semantic model training corpus. For example, semantic expansion 304 may receive keyword taxonomy 306 as an input of seed terms. Keyword taxonomy 306 may be generated by one or more users who enter keywords and related categories. Semantic expansion 304 may expand the seed terms (e.g., the keyword taxonomy 306) based on the input documents to generate the expanded keyword taxonomy 308. For example, semantic expansion 304 may generate one or more semantic vectors and identify semantic vectors (corresponding to new keywords) for inclusion in second keyword taxonomy 308 based on similarity scores of the semantic vectors. The expanded keyword taxonomy 308 may include more detailed keywords in various categories, as well as common misspellings of keywords, such that words intended as keywords may be identified by system 300. The expanded keyword taxonomy 308 may be combined with the keyword taxonomy 306 to generate a taxonomy used by system 300. Additionally, or alternatively, the expanded keyword taxonomy 308 and the keyword taxonomy 306 may be separately used to provide for an ability to rate each taxonomy individually.

In addition to being provided to semantic expansion 304, the ingested documents (e.g., from document ingest 302) are provided to tokenizer and sentencizer 310. Tokenizer and sentencizer 310 is configured to detect one or more tokens from the input documents, and to detect one or more sentences from the input documents. For example, tokenizer and sentencizer 310 may break an input document into words (or words, names, and/or phrases) that are represented by tokens. Additionally, tokenizer and sentencizer 310 may detect sentence breaks in the documents using a dependency parser.

Tokens generated by tokenizer and sentencizer 310 may be provided to entity detector 312. Entity detector 312 is configured to receive the tokens and entity list 314 and to determine locations of the entities within the tokens. For example, the entities may be a list of companies or corporations, and entity detector 312 may determine locations (within a list of tokens, or in a sentence) of one or more entities. As an example, entity detector 312 may detect a token that corresponds to Verizon and may identify the location of the token. Locations of the entities may also be referred to as entity hit locations. The entity hit locations may be provided from entity detector 312 to keyword-entity pairing 322.

Tokens generated by tokenizer and sentencizer 310 may also be provided to keyword location detector 316. Keyword location detector 316 may also receive one or more taxonomies and may identify keyword hit locations and keyword hit text (e.g., which keywords were identified) from the list of tokens. For example, a keyword in the taxonomy may be "lawsuit", and keyword location detector 316 may output a location (e.g., in the list of tokens, or in a sentence) and the text "lawsuit". The keyword hit locations may be provided to keyword-entity pairing 322, and the keyword hit text may be pooled together as keyword sentences 318.

The one or more taxonomies provided to keyword location detector 316 may also be provided to keyword-based selector 320. Keyword-based selector 320 may be configured to select each keyword for determining whether there is a keyword-entity match in one of a plurality of input data sources, as further described herein.

Keyword-entity pairing 322 is configured to receive entity hit location from entity detector 312, sentence breaks from tokenizer and sentencizer 310, and keyword hit locations from keyword location detector 316. Keyword-entity pairing 322 is configured to determine, for each keyword, the nearest entity to the keyword (and whether it is in the same sentence or not). Keyword-entity pairing 322 may be configured to determine bi-directional pairings, e.g., the entity that is closest to the keyword, whether the entity is before or after the keyword. For example, if the keyword "lawsuit" is detected, keyword-entity pairing 322 may pair the keyword with a first entity that is four tokens before the keyword instead of a second entity that is 20 tokens after the keyword, even if the first entity is in a different sentence. In some implementations, keyword-entity pairing 322 is configured to operate in parallel such that multiple keywords may be paired with entities concurrently. After pairing keywords and entities, the pairings are provided to filter 324.

Filter 324 is configured to filter out keyword-entity pairs that are more than a threshold number of tokens apart. For example, filter 324 may compare the distance between the keyword and the entity of a keyword-entity pair to a threshold, and if the distance is greater than or equal to the threshold, the keyword-entity pair is discarded. In some implementations, the threshold may be 100 tokens. Additionally, filter 324 may assign a score to each filtered keyword-entity pair based on the distance. For example, a first keyword-entity pair with a lower distance may have a higher score than a second keyword-entity pair with a higher distance. The keyword-entity pairs may be mapped to the sentences that contain them, and the sentences may be assigned to pools based on the number of sentences. For example, if the keyword and the entity are both in the same sentence, the sentence is assigned to same sentence match pool 326. Alternatively, if the entity is in a different sentence than the keyword, the sentences are assigned to cross-sentence match pool 328.

Keyword sentences 318, same sentence match pool 318, and cross-sentence match pool 328 are used as inputs, based on a keyword selected by keyword-based selector 320, to output results for comparison. The comparison may be between sentence(s) from same sentence match pool 326 or cross sentence match pool 328 and a random baseline sentence selected from keyword sentences 318. Comparator 330 may perform a pairwise comparison between the selected sentence(s) and the baseline sentence based on scores of the sentences, user input, or a combination thereof. For example, the user input may indicate a rating of each sentence by a user, such as a subject matter expert. The comparisons result in rankings, which are stored as method rankings 332.

To test the performance of system 300 (and/or system 100 of FIG. 1), an experiment comparing the performances of systems using single-sentence risk detection and systems only using multi-sentence risks was designed. This experiment measured the performance of purely multi-sentence hits against purely single-sentence hits. In addition, a baseline system was tested that detected only risk terms without searching for corresponding entities. Taken together, the three hypotheses tested are as follows:

$$H_1: p_{multi} > p_{base}, H_\emptyset: p_{multi} = p_{base}$$

$$H_2: p_{single} > p_{base}, H_\emptyset: p_{single} = p_{base}$$

$$H_3: p_{multi} > p_{single}, H_\emptyset: p_{multi} = p_{single}$$

$H_1$ and $H_2$ test whether each method of detecting risk co-occurrence with an entity performs better than random chance at selecting a risk term in the document and assessing it to have been associated with the entity. $H_3$ tests whether the distance-based measure corresponding to the system outperforms a sentential approach.

A virtualized Ubuntu 14.04 machine with 8 vC-PUs—running on 2.30 GHz Intel Xeon E5-2670 processors and 64 GB RAM was chosen to support the first experiment.

The names of the top Fortune 100 companies from 2017 were fed as input into a series of news requests from Thomson Reuters' CLEAR System to System platform for the most recent 1000 articles mentioning each company. Ignoring low coverage and bodiless news articles, 99,424 individual documents were returned. Each article was then fed into the system and risk detections were found with a distance cutoff of 100 tokens. For each identified risk, whether single or multi-sentence, the system also selected a baseline sentence at random from the corresponding document for pairwise comparison.

TABLE 1

Sample risk terms from the seed and expanded sets.

| Risk Category | Keyword Seed Taxonomy | Enriched Keyword Taxonomy |
|---|---|---|
| Cybersecurity | n = 26<br>cybercrime, hack, DDOS, antivirus, data breach, ransomware, penetration, . . . | n = 123<br>4front security, cyber deterrence, cloakware, unauthenticated, . . . |
| Terrorism | n = 37<br>terrorism, bio-terrorism, extremist, car bombing, hijack, guerrilla, . . . | n = 147<br>anti-terrorism, bomb maker, explosives, hezbollah, jihadi, nationalist, . . . |
| Legal | n = 38<br>litigation, indictment, allegation, failure to comply, sanctions violations, . . . | n = 162<br>appropriation, concealment, counter suit, debtor, expropriation, issuer, . . . |

A dependency parse was the largest bottleneck with an expected total runtime for the near 100,000 documents at approximately 7 calendar-days of computation. In the interest of runtime, only the first 21,000 documents read in order of machine-generated news article ID were analyzed. Once all selected documents were processed, single and multi-sentence spans relating to the same risk category were paired, but potentially different entities and documents, for pairwise evaluations.

As summarized in Table 1, starting with manually-created seed terms in each category of risk, encodings were learned from a concatenation of the news article text. Selecting the top ten most similar terms for each in-vocabulary seed term resulted in an expanded taxonomy with a 326.31% increase on average across the three categories. This term expansion not only introduced new vocabulary to the taxonomy, but also variants and common misspellings of keywords, which are important in catching risk terms "in the wild". Some cleanup of the term expansion was required to filter out punctuation and tokenization variants.

Analysts were asked to give their preference for "System A" or "System B" or "Neither" when presented with randomized pairs of output. Percentage preferences for the overarching system and each of six pairings was tested for significance with Pearson's $\chi^2$ using raw counts.

4514 judgments were collected from eight subject matter experts to compute system preferences associated with single, multi- and baseline sentence extractions. Roughly 28% of all evaluated extractions (1266/4514) received a preference judgment (32% from the seed set (698/2198) and 24% from the expansion set (568/2316)) where 72% received a "Neither" rating.

TABLE 2

Pearson's $x^2$ and p values (d.f. = 1)

| System | $x^2$ |
|---|---|
| Overall | 8.530 |
| single v. multi (seed v. expand) | p = 0.003 |
| CEREALsbs | 28.088 |
| single v. baseline (seed) | p = 1.159e−07 |
| CEREALmbs | 25.358 |
| multi v. baseline (seed) | p = 4.762e−07 |
| CEREALsms | 37.763 |
| single v. multi (seed) | p = 7.99e−10 |
| CEREALsbe | 6.858 |
| single v. baseline (expand) | p = 0.008 |
| CEREALmbe | 25.705 |
| multi v. baseline (expand) | p = 3.978e−07 |
| CEREALsme | 6.316 |
| single v. multi (expand) | p = 0.011 |

Figure 4:
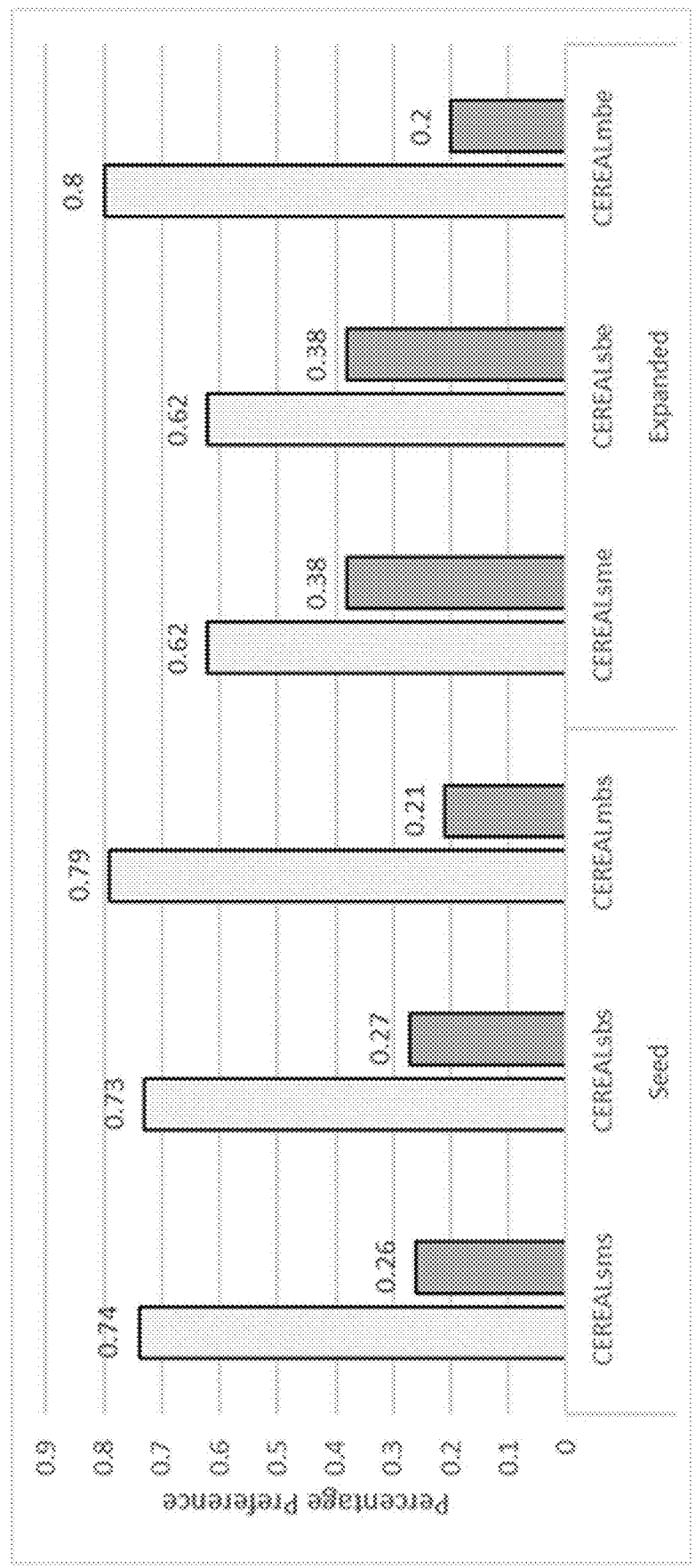
FIG. 4 illustrates a graph of expert preference ratings.

As summarized in Table 2 (where "CEREAL" corresponds to the system) and by graph 400 of FIG. 4, all single and multi-sentence extractions across the seed and expansion sets outperform the baseline by statistically significant margins. For the seed set, the single sentence extractions outperform the multi-sentence extractions by a statistically significant margin as well (p≤0.01). However, for the expansion set, the multi-sentence extractions gain significant ground (26% to 38% increase in preference).

1283 (28%) of evaluations were doubly annotated for calculation of Cohen's Kappa. Average K for the seed set was 0.284 and 0.144 for the expansion set (which suffers from low sample size). This is uniformly low across all categories, but not an unusual result given the task and the range of analyst expertise.

The system's distance metric provides benefit well above the baseline, so $H_1$ and $H_2$ can be accepted. However, while the high recall is not surprising, i.e., there is no classification engine and all keywords in the taxonomy are assumed to capture risk in some context, 72% of unwanted results need to be effectively managed to not nullify any analytical benefits from the preferred results. Adjusting token distance thresholds is one potential way forward that requires further analysis—although this may be subject to document or genre effects. The current distribution of distances under the 100 threshold are fairly uniform.

$H_3$, which tests the assumption that multi-sentence returns will have greater analytical utility, is not accepted. However, the data indicates that as the taxonomy expands, the preference for the multi-sentences increases by 46% over the single sentence seed set extractions. In the evaluation set, there were 18 keywords from the expanded taxonomy—action, assertion, attack, authentication, claim, complaint, compliance, conduct, foreclosure, harassment, identity, military, professionalism, require, requirement, security, separation, and suit. The expanded keywords exhibit a greater range of specificity relative to a risk category than the seed terms. The more specific a risk term is, the less likely it is to appear in ambiguous contexts—arguably why the expert analyst constructs the seed list as they do. Absent additional information, the more general the risk term, the higher likelihood of ambiguity. It seems here that additional study is potentially required to understand the nature of the risk of the expanded keywords because of their general nature. Based on the proliferation of more general terms in the expanded set, perhaps cull high recall, the thresholding should consider the degree of semantic granularity as well.

Thus, the system described herein includes a scalable system for finding entity-event pairings which, as compared to other systems, better incorporates human insights in the initial system configuration to obviate the need for a risk classification engine. Further, without relying on multiple complex NLP sub-systems to make connections between entities and event keywords, the system may derive maximum benefit from surface information.

While applied here to the risk mining space, in other implementations, the system could be used for any data, entities and taxonomies to support generalized event monitoring. Additionally, the system may address high system recall relative to maintaining flexibility for analyst users and dynamic definition of the risk problem space—this may include summarization of results for better presentation, alternative source data at the direction of the analyst for given risk categories, and token distance thresholding.

End Example

Figure 5:
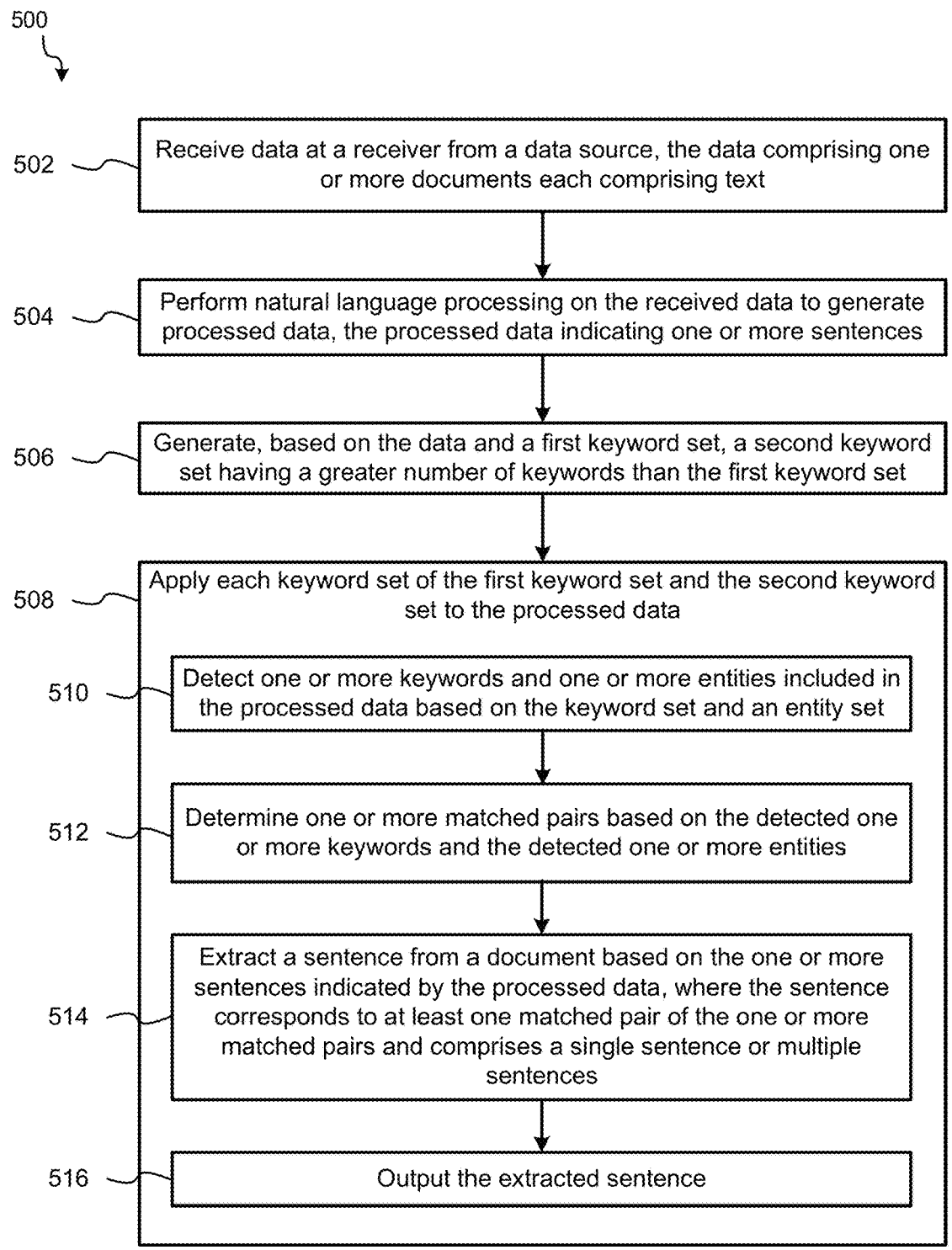
FIG. 5 is a flow chart illustrating an example of a method of identifying an event in data.

Referring to FIG. 5 is a flow diagram of a method 500 of identifying an event in data. In some implementations, the method 400 may be performed by system 100 of FIG. 1 (e.g.,), one or more components to execute operations of FIG. 2, or system 300 of FIG. 3.

Method 500 includes receiving data at a receiver from a data source, the data comprising one or more documents each comprising text, at block 502. For example, data ingestor 120 may receive documents (e.g., the data) from data sources 170.

Method 500 includes performing natural language processing on the received data to generate processed data, the processed data indicating one or more sentences, at block 504. For example, data ingestor 120 may perform natural language processing on the received documents to generate processed data that indicates one or more sentences.

Method 500 also includes generating, based on the data and a first keyword set, a second keyword set having a greater number of keywords than the first keyword set, at block 506. For example, taxonomy expander 124 may generate a second keyword set having a greater number of keywords than a first keyword set (e.g., a seed set).

Method 500 further includes apply each keyword set of the first keyword set and the second keyword set to the processed data, at block 508. Applying each keyword set may include one or more blocks, such as blocks 510, 512, 514, and 516, as described further herein.

Method 500 further includes detecting one or more keywords and one or more entities included in the processed data based on the keyword set and an entity set, at block 510. For example, term detector 121 may detect one or more keywords and one or more entities included in the processed data based on the keyword set and an entity set.

Method 500 further includes determining one or more matched pairs based on the detected one or more keywords and the detected one or more entities, at block 512. For example, output generator 122 may determine one or more matched pairs based on the detected one or more keywords and the detected one or more entities.

Method 500 further includes extracting a sentence from a document based on the one or more sentences indicated by the processed data, where the sentence corresponds to at least one matched pair of the one or more matched pairs and comprises a single sentence or multiple sentences, at block 514. For example, output generator 122 may extract a sentence from a document based on the one or more sentences indicated by the processed data, such that the sentence corresponds to at least one matched pair. The sentence may be a single sentence or multiple sentences (e.g., if a matched pair crosses two or more sentences).

Method 500 further includes outputting the extracted sentence, at block 516. For example, output generator 122 may output the extracted sentence, for example, for display to a user. Additionally, or alternatively, the extracted sentence may be stored at a memory.

In some implementations, performing the natural language processing includes performing, on the data, tokenization, lemmatization, sentencization, or a combination thereof. For example, data ingestor 102 may perform tokenization, lemmatization, sentencization, or a combination thereof, on data from data sources 170. Additionally, or alternatively, method 500 may further comprise, for each matched pair based on the first keyword set and each matched pair based on the second keyword set, determining whether the keyword and the entity of the matched pair are included in the same sentence. Additionally, extracting the sentence from the document includes extracting a single sentence based on a determination that the keyword and the entity are included in the same sentence and extracting multiple sentences based on a determination that the keyword and the entity are not included in the same sentence. For example, if the keyword and the entity of a matched pair are in the same sentence, output generator 122 may extract a single sentence. Alternatively, if the keyword and the entity of a matched pair are in different sentences, output generator 122 may extract multiple sentences.

In some implementations, method 500 further includes initiating a pipe( ) operation on the data to perform the natural language processing. Performing the natural language processing further includes using a dependency based sentencizer to generate the processed data indicating one or more sentences, converting the data to a lemmatized format, using a tokenizer to generate one or more tokens, using a part-of-speech tagger to generate part-of-speech data, using a named entity recognizer to identify one or more entities, or a combination thereof. In some such implementations, the processed data is in a format that is compatible with Python. For example, data ingestor 120 may include a dependency based sentencizer, a lemmatizer, a tokenizer, a part-of-speech tagger, a named entity recognizer, or a combination thereof In some implementations, generating the second keyword set includes generating one or more semantic vectors. Generating the second keyword set also includes, for each keyword of the first keyword set: determining a semantic vector having a highest similarity score to the keyword and identifying one or more terms of the determined semantic vector as a candidate term. Generating the second keyword set also includes selecting at least one candidate term to be added to the first keyword set to generate the second keyword set. For example, taxonomy expander 124 may generate semantic vectors and identify terms of semantic vectors as candidate terms based on similarity scores. In some such implementations, generating the one or more semantic vectors includes, for each document of one or more documents corresponding to the data, generating a corresponding semantic vector based on a skipgram model that utilizes words and subwords from the document. For example, a skipgram generator, such as Fasttext, may be used to generate the semantic vectors. Generating the second keyword set further includes, for each keyword of the first keyword set, comparing a similarity score of the determined semantic vector having a highest similarity score to a threshold. The semantic vector is used to identify the candidate term based on a determination that the similarity score of the determined semantic vector is greater than or equal to the threshold.

In some implementations, the extracted sentence is output to an electronic device associated with an analyst, and method 500 further includes receiving an input from the analyst responsive to the extracted sentence, storing an indication of the input, and sending a notification corresponding to the extracted sentence, the input, or both. The notification includes a link to a data source, a text extraction from a document, the matched pair corresponding to the extracted sentence, the input, an identifier of the analyst, or a combination thereof.

In some implementations, method 500 further includes receiving a selection of a first event category of multiple event categories and retrieving the first keyword set based on the selection of the first event category. For example, different keyword sets may correspond to different event categories. To illustrate, one keyword set may correspond to "terrorism" and another keyword set may correspond to "legal." In some such implementations, the multiple event categories include cybersecurity, terrorism, legal/non-compliance, or a combination thereof. In some such implementations, method 500 further includes receiving a selection of a second event category of the multiple event categories, retrieving a third keyword set based on the selection of the second event category, generating, based on the third keyword set, a fourth keyword set having a greater number of keywords than the third keyword set, and, for each keyword set of the third keyword set and each keyword in the fourth keyword set: detecting one or more keywords and one or more entities included in the processed data based on the keyword set and the entity set and determining one or more matched pairs based on the detected one or more keywords and the detected one or more entities. For example, different taxonomies corresponding to different entity lists may be generated and used to determine keyword-entity pairs.

In some implementations, the sentence includes the multiple sentences, and the multiple sentences include a sentence that includes the at least one matched pair, a sentence that includes the keyword of the at least one matched pair, a sentence preceding the sentence that includes the keyword of the at least one matched pair, a sentence following the sentence with the keyword the at least one matched pair, a sentence that includes the entity of the at least one matched pair, a sentence preceding the sentence that includes the entity of the at least one matched pair, a sentence following the sentence with the entity of the at least one matched pair, or a combination thereof. Additionally, or alternatively, the data source includes a streaming data source, news data, a database, or a combination thereof, and the entity set indicates an individual, a company, a government, an organization, or a combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-5 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for identifying an event in data, the method comprising:
    receiving data at a receiver from a data source, the data comprising one or more documents each comprising text;
    performing natural language processing on the received data to generate processed data, the processed data indicating one or more sentences;
    generating, based on the data and a first keyword set, a second keyword set having a greater number of keywords than the first keyword set;
    for each keyword set of the first keyword set and the second keyword set:
        detecting one or more keywords and one or more entities included in the processed data based on the keyword set and an entity set;
        determining one or more matched pairs based on the detected one or more keywords and the detected one or more entities, each matched pair of the one or more matched pairs including a keyword from the first keyword set or the second keyword set and an entity from the entity set that are separated in the processed data by a corresponding distance that is less than a threshold;
        extracting at least one sentence from a document based on the one or more sentences indicated by the processed data, where the at least one sentence corresponds to at least one matched pair of the one or more matched pairs and comprises a single sentence or multiple sentences, wherein, for at least a subset of the first keyword set and the second keywords set, the at least one sentence comprises multiple sentences, the multiple sentences comprise a sentence that includes the at least one matched pair, a sentence that includes the keyword of the at least one matched pair, a sentence preceding the sentence that includes the keyword of the at least one matched pair, a sentence following the sentence with the keyword of the at least one matched pair, a sentence that includes the entity of the at least one matched pair, a sentence preceding the sentence that includes the entity of the at least one matched pair, a sentence following the sentence with the entity of the at least one matched pair, or a combination thereof; and
        outputting the extracted at least one sentence to an electronic device associated with an analyst;
    receiving an input from the analyst responsive to the extracted at least one sentence;
    storing an indication of the input; and
    sending a notification corresponding to the extracted at least one sentence, the input, or both,
    wherein the notification includes a link to a data source, a text extraction from a document, the at least one matched pair corresponding to the extracted at least one sentence, the input, an identifier of the analyst, or a combination thereof.

2. The method of claim 1, wherein determining the one or more matched pairs comprises, for each matched pair of keyword and entity:
    determining a distance between the keyword and the entity of the matched pair in the processed data;
    comparing the distance to the threshold; and
    discarding the matched pair based on the distance failing to satisfy the threshold.

3. The method of claim 2, wherein determining the one or more matched pairs further comprises, for each matched pair of keyword and entity:
    retaining the matched pair based on the distance satisfying the threshold.

4. The method of claim 1, wherein performing the natural language processing comprises performing, on the data, tokenization, lemmatization, sentencization, or a combination thereof.

5. The method of claim 1, further comprising, for each matched pair based on the first keyword set and each matched pair based on the second keyword set:
    determining whether the keyword and the entity of the matched pair are included in the same sentence; and
    wherein extracting the at least one sentence from the document comprises:
        extracting a single sentence based on a determination that the keyword and the entity are included in the same sentence; and
        extracting multiple sentences based on a determination that the keyword and the entity are not included in the same sentence.

6. The method of claim 1, further comprising:
    initiating a pipe operation on the data to perform the natural language processing; and
    wherein performing natural language processing further comprises:
        using a dependency based sentencizer to generate the processed data indicating the one or more sentences;
        converting the data to a lemmatized format;
        using a tokenizer to generate one or more tokens;
        using a part-of-speech tagger to generate part-of-speech data;
        using a named entity recognizer to identify one or more entities;
        or a combination thereof; and
    wherein the processed data is in a format that is compatible with Python.

7. The method of claim 1, wherein generating the second keyword set comprises:
    adding keywords of the first keyword set to the second keyword set;
    generating one or more semantic vectors; and for each keyword of the first keyword set:
    determining a semantic vector having a highest similarity score to the keyword;
    identifying one or more terms of the determined semantic vector as candidate terms based on a determination that the similarity score of the determined semantic vector is greater than or equal to a similarity threshold; and
    selecting at least one candidate term to be added to the second keyword set.

8. A system comprising:
a data ingestor configured to:
    receive data at a receiver from a data source, the data comprising one or more documents each comprising text; and
    perform natural language processing on the received data to generate processed data, the processed data indicating one or more sentences;
a taxonomy expander configured to:
    generate, based on the data and a first keyword set, a second keyword set having a greater number of keywords than the first keyword set;
a term detector configured to:
    detect, for each keyword set of the first keyword set and the second keyword set, one or more keywords and one or more entities included in the processed data based on the keyword set and an entity set; and
an output generator configured to, for each keyword set of the first keyword set and the second keyword set:
    determine one or more matched pairs based on the detected one or more keywords and the detected one or more entities, each matched pair of the one or more matched pairs including a keyword from the first keyword set or the second keyword set and an entity from the entity set that are separated in the processed data by a corresponding distance that is less than a threshold;
    extract at least one sentence from a document based on the one or more sentences indicated by the processed data, where the at least one sentence corresponds to at least one matched pair of the one or more matched pairs and comprises a single sentence or multiple sentences, wherein, for at least a subset of the first keyword set and the second keywords set, the at least one sentence comprises multiple sentences, the multiple sentences comprise a sentence that includes the at least one matched pair, a sentence that includes the keyword of the at least one matched pair, a sentence preceding the sentence that includes the keyword of the at least one matched pair, a sentence following the sentence with the keyword of the at least one matched pair, a sentence that includes the entity of the at least one matched pair, a sentence preceding the sentence that includes the entity of the at least one matched pair, a sentence following the sentence with the entity of the at least one matched pair, or a combination thereof; and
    output the extracted at least one sentence to an electronic device associated with an analyst;
    receive an input from the analyst responsive to the extracted at least one sentence;
    store an indication of the input; and
    send a notification corresponding to the extracted at least one sentence, the input, or both,
    wherein the notification includes a link to a data source, a text extraction from a document, the at least one matched pair corresponding to the extracted at least one sentence, the input, an identifier of the analyst, or a combination thereof.

9. The system of claim 8, further comprising:
a database coupled to the data ingestor, the taxonomy expander, the term detector, the output generator, or a combination thereof.

10. The system of claim 9, wherein the database is configured to store the first keyword set, the second keyword set, the entity set, the processed data, one or more thresholds, one or more extracted sentences, a plurality of matched pairs, or a combination thereof.

11. The system of claim 8, further comprising:
an interface configured to enable communication with the data source, an electronic device, or a combination thereof.

12. The system of claim 8, further comprising:
a filter configured to:
    for each matched pair of keyword and entity:
        determine a distance between the keyword and the entity of the matched pair in the processed data;
        perform a comparison between the determined distance and the threshold; and
        determine to retain the matched pair or discard the matched pair based on whether or not the comparison indicates the determined distance is greater than or equal to the threshold.

13. The system of claim 8, wherein, to determine the one or more matched pairs, the output generator is further configured to:
    for each keyword of the detected one or more keywords, identify a corresponding entity of the detected one or more entities that is positioned closest to the corresponding keyword to determine a matched pair for the keyword.

14. A computer-based tool including non-transitory computer readable media having stored thereon computer code which, when executed by a processor, causes a computing device to perform operations comprising:
    receiving data at a receiver from a data source, the data comprising one or more documents each comprising text;
    performing natural language processing on the received data to generate processed data, the processed data indicating one or more sentences;
    generating, based on the data and a first keyword set, a second keyword set having a greater number of keywords than the first keyword set;
    for each keyword of the first keyword set and the second keyword set:
        detecting one or more keywords and one or more entities included in the processed data based on the keyword set and an entity set;
        determining one or more matched pairs based on the detected one or more keywords and the detected one or more entities, each matched pair of the one or more matched pairs including a keyword from the first keyword set or the second keyword set and an entity from the entity set that are separated in the processed data by a corresponding distance that is less than a threshold;
        extracting at least one sentence from a document based on the one or more sentences indicated by the processed data, where the at least one sentence corresponds to at least one matched pair of the one or more matched pairs and comprises a single sentence or multiple sentences, wherein, for at least a subset of the first keyword set and the second keywords set, the at least one sentence comprises multiple sentences, the multiple sentences comprise a sentence that includes the at least one matched pair, a sentence that includes the keyword of the at least one matched pair, a sentence preceding the sentence that includes the keyword of the at least one matched pair, a sentence following the sentence with the keyword the at least one matched pair, a sentence that includes the entity of the at least one matched pair, a sentence preceding the sentence that includes the entity of the at least one matched pair, a sentence following the sentence with the entity of the at least one matched pair, or a combination thereof; and outputting the extracted at least one sentence to an electronic device associated with an analyst;

receiving an input from the analyst responsive to the extracted at least one sentence;

storing an indication of the input; and sending a notification corresponding to the extracted at least one sentence, the input, or both, wherein the notification includes a link to a data source, a text extraction from a document, the at least one matched pair corresponding to the extracted at least one sentence, the input, an identifier of the analyst, or a combination thereof.

15. The computer-based tool of claim 14, wherein the corresponding distance between keywords and entities of the one or more matched pairs is a distance in tokens of the processed data.

16. The computer-based tool of claim 14, wherein the operations further comprise:

receiving a selection of a first event category of multiple event categories; and retrieving the first keyword set based on the selection of the first event category.

17. The computer-based tool of claim 16, wherein:

the multiple event categories comprise cybersecurity, terrorism, legal/non-compliance, or a combination thereof;

the data source comprises a streaming data source, news data, a database, or a combination thereof, and the entity set indicates an individual, a company, a government, an organization, or a combination thereof.

18. The computer-based tool of claim 17, wherein the operations further comprise:

receiving a selection of a second event category of the multiple event categories;

retrieving a third keyword set based on the selection of the second event category;

generating, based on the third keyword set, a fourth keyword set having a greater number of keywords than the third keyword set;

for each keyword set of the third keyword set and the fourth keyword set:

detecting one or more keywords and one or more entities included in the processed data based on the keyword set and the entity set; and determining one or more matched pairs based on the detected one or more keywords and the detected one or more entities.

19. A method for identifying an event in data, the method comprising:

receiving data at a receiver from a data source, the data comprising one or more documents each comprising text;

initiating a pipe operation to perform natural language processing on the received data to generate processed data, the processed data indicating one or more sentences, wherein performing the natural language processing comprises using a dependency based sentencizer to generate the processed data indicating the one or more sentences, converting the data to a lemmatized format, using a tokenizer to generate one or more tokens, using a part-of-speech tagger to generate part-of-speech data, using a named entity recognizer to identify one or more entities, or a combination thereof, and wherein the processed data is in a format that is compatible with Python; and generating, based on the data and a first keyword set, a second keyword set having a greater number of keywords than the first keyword set; and for each keyword set of the first keyword set and the second keyword set:

detecting one or more keywords and one or more entities included in the processed data based on the keyword set and an entity set;

determining one or more matched pairs based on the detected one or more keywords and the detected one or more entities, each matched pair of the one or more matched pairs including a keyword from the first keyword set or the second keyword set and an entity from the entity set that are separated in the processed data by a corresponding distance that is less than a threshold;

extracting at least one sentence from a document based on the one or more sentences indicated by the processed data, where the at least one sentence corresponds to at least one matched pair of the one or more matched pairs and comprises a single sentence or multiple sentences, wherein, for at least a subset of the first keyword set and the second keywords set, the at least one sentence comprises multiple sentences, the multiple sentences comprise a sentence that includes the at least one matched pair, a sentence that includes the keyword of the at least one matched pair, a sentence preceding the sentence that includes the keyword of the at least one matched pair, a sentence following the sentence with the keyword the at least one matched pair, a sentence that includes the entity of the at least one matched pair, a sentence preceding the sentence that includes the entity of the at least one matched pair, a sentence following the sentence with the entity of the at least one matched pair, or a combination thereof; and outputting the extracted at least one sentence to an electronic device associated with an analyst.

20. The method of claim 19, wherein determining the one or more matched pairs comprises, for each matched pair of keyword and entity:

determining a distance between the keyword and the entity of the matched pair in the processed data;

comparing the distance to the threshold; and discarding the matched pair based on the distance failing to satisfy the threshold.

21. The method of claim 20, wherein determining the one or more matched pairs further comprises, for each matched pair of keyword and entity:

retaining the matched pair based on the distance satisfying the threshold.

22. The method of claim 19, wherein performing the natural language processing comprises performing, on the data, tokenization, lemmatization, sentencization, or a combination thereof.

23. The method of claim 19, further comprising, for each matched pair based on the first keyword set and each matched pair based on the second keyword set:
determining whether the keyword and the entity of the matched pair are included in the same sentence; and
wherein extracting the at least one sentence from the document comprises:
extracting a single sentence based on a determination that the keyword and the entity are included in the same sentence; and
extracting multiple sentences based on a determination that the keyword and the entity are not included in the same sentence.

24. The method of claim 19, wherein generating the second keyword set comprises:
adding keywords of the first keyword set to the second keyword set;
generating one or more semantic vectors; and
for each keyword of the first keyword set:
determining a semantic vector having a highest similarity score to the keyword;
identifying one or more terms of the determined semantic vector as candidate terms based on a determination that the similarity score of the determined semantic vector is greater than or equal to a similarity threshold; and
selecting at least one candidate term to be added to the second keyword set.

25. The method of claim 19, further comprising:
receiving an input from the analyst responsive to the extracted at least one sentence;
storing an indication of the input; and
sending a notification corresponding to the extracted at least one sentence, the input, or both,
wherein the notification includes a link to a data source, a text extraction from a document, the at least one matched pair corresponding to the extracted at least one sentence, the input, an identifier of the analyst, or a combination thereof.

26. A system comprising:
a data ingestor configured to:
receive data at a receiver from a data source, the data comprising one or more documents each comprising text; and
initiating a pipe operation to perform natural language processing on the received data to generate processed data, the processed data indicating one or more sentences,
wherein performing the natural language processing comprises using a dependency based sentencizer to generate the processed data indicating the one or more sentences, converting the data to a lemmatized format, using a tokenizer to generate one or more tokens, using a part-of-speech tagger to generate part-of-speech data, using a named entity recognizer to identify one or more entities, or a combination thereof, and
wherein the processed data is in a format that is compatible with Python; and
a taxonomy expander configured to:
generate, based on the data and a first keyword set, a second keyword set having a greater number of keywords than the first keyword set;
a term detector configured to:
detect, for each keyword set of the first keyword set and the second keyword set, one or more keywords and one or more entities included in the processed data based on the keyword set and an entity set; and
an output generator configured to, for each keyword set of the first keyword set and the second keyword set:
determine one or more matched pairs based on the detected one or more keywords and the detected one or more entities, each matched pair of the one or more matched pairs including a keyword from the first keyword set or the second keyword set and an entity from the entity set that are separated in the processed data by a corresponding distance that is less than a threshold;
extract at least one sentence from a document based on the one or more sentences indicated by the processed data, where the at least one sentence corresponds to at least one matched pair of the one or more matched pairs and comprises a single sentence or multiple sentences, wherein, for at least a subset of the first keyword set and the second keywords set, the at least one sentence comprises multiple sentences, the multiple sentences comprise a sentence that includes the at least one matched pair, a sentence that includes the keyword of the at least one matched pair, a sentence preceding the sentence that includes the keyword of the at least one matched pair, a sentence following the sentence with the keyword the at least one matched pair, a sentence that includes the entity of the at least one matched pair, a sentence preceding the sentence that includes the entity of the at least one matched pair, a sentence following the sentence with the entity of the at least one matched pair, or a combination thereof; and
output the extracted at least one sentence to an electronic device associated with an analyst.

27. The system of claim 26, further comprising:
a database coupled to the data ingestor, the taxonomy expander, the term detector, the output generator, or a combination thereof.

28. The system of claim 27, wherein the database is configured to store the first keyword set, the second keyword set, the entity set, the processed data, one or more thresholds, one or more extracted sentences, a plurality of matched pairs, or a combination thereof.

29. The system of claim 26, further comprising:
an interface configured to enable communication with the data source, an electronic device, or a combination thereof.

30. The system of claim 26, further comprising:
a filter configured to:
for each matched pair of keyword and entity:
determine a distance between the keyword and the entity of the matched pair in the processed data;
perform a comparison between the determined distance and the threshold; and
determine to retain the matched pair or discard the matched pair based on whether or not the comparison indicates the determined distance is greater than or equal to the threshold.

31. The system of claim 26, wherein, to determine the one or more matched pairs, the output generator is further configured to:
for each keyword of the detected one or more keywords, identify a corresponding entity of the detected one or more entities that is positioned closest to the corresponding keyword to determine a matched pair for the keyword.

32. A computer-based tool including non-transitory computer readable media having stored thereon computer code which, when executed by a processor, causes a computing device to perform operations comprising:

receiving data at a receiver from a data source, the data comprising one or more documents each comprising text;

initiating a pipe operation to perform natural language processing on the received data to generate processed data, the processed data indicating one or more sentences, wherein performing the natural language processing comprises using a dependency based sentencizer to generate the processed data indicating the one or more sentences, converting the data to a lemmatized format, using a tokenizer to generate one or more tokens, using a part-of-speech tagger to generate part-of-speech data, using a named entity recognizer to identify one or more entities, or a combination thereof, and wherein the processed data is in a format that is compatible with Python; and generating, based on the data and a first keyword set, a second keyword set having a greater number of keywords than the first keyword set;

for each keyword of the first keyword set and the second keyword set:

detecting one or more keywords and one or more entities included in the processed data based on the keyword set and an entity set;

determining one or more matched pairs based on the detected one or more keywords and the detected one or more entities, each matched pair of the one or more matched pairs including a keyword from the first keyword set or the second keyword set and an entity from the entity set that are separated in the processed data by a corresponding distance that is less than a threshold;

extracting at least one sentence from a document based on the one or more sentences indicated by the processed data, where the at least one sentence corresponds to at least one matched pair of the one or more matched pairs and comprises a single sentence or multiple sentences, wherein, for at least a subset of the first keyword set and the second keywords set, the at least one sentence comprises multiple sentences, the multiple sentences comprise a sentence that includes the at least one matched pair, a sentence that includes the keyword of the at least one matched pair, a sentence preceding the sentence that includes the keyword of the at least one matched pair, a sentence following the sentence with the keyword the at least one matched pair, a sentence that includes the entity of the at least one matched pair, a sentence preceding the sentence that includes the entity of the at least one matched pair, a sentence following the sentence with the entity of the at least one matched pair, or a combination thereof; and outputting the extracted at least one sentence to an electronic device associated with an analyst.

33. The computer-based tool of claim 32, wherein the corresponding distance between keywords and entities of the one or more matched pairs is a distance in tokens of the processed data.

34. The computer-based tool of claim 32, wherein the operations further comprise:

receiving a selection of a first event category of multiple event categories; and retrieving the first keyword set based on the selection of the first event category.

35. The computer-based tool of claim 34, wherein:

the multiple event categories comprise cybersecurity, terrorism, legal/non-compliance, or a combination thereof;

the data source comprises a streaming data source, news data, a database, or a combination thereof; and the entity set indicates an individual, a company, a government, an organization, or a combination thereof.

36. The computer-based tool of claim 34, wherein the operations further comprise:

receiving a selection of a second event category of the multiple event categories;

retrieving a third keyword set based on the selection of the second event category;

generating, based on the third keyword set, a fourth keyword set having a greater number of keywords than the third keyword set;

for each keyword set of the third keyword set and the fourth keyword set:

detecting one or more keywords and one or more entities included in the processed data based on the keyword set and the entity set; and determining one or more matched pairs based on the detected one or more keywords and the detected one or more entities.

* * * * *